(12) United States Patent
Guner et al.

(10) Patent No.: US 10,641,735 B2
(45) Date of Patent: May 5, 2020

(54) REMOTE-FIELD EDDY CURRENT BASED TOTAL THICKNESS LOGGING

(71) Applicant: Halliburton Energy Services, Inc., Houston, TX (US)

(72) Inventors: Baris Guner, Houston, TX (US); Burkay Donderici, Houston, TX (US); Reza K. Amineh, Houston, TX (US); Ahmed E. Fouda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/089,293

(22) PCT Filed: Jun. 27, 2017

(86) PCT No.: PCT/US2017/039547
§ 371 (c)(1),
(2) Date: Sep. 27, 2018

(87) PCT Pub. No.: WO2019/005016
PCT Pub. Date: Jan. 3, 2019

(65) Prior Publication Data
US 2020/0103374 A1 Apr. 2, 2020

(51) Int. Cl.
*G01N 27/90* (2006.01)
*E21B 47/10* (2012.01)
(Continued)

(52) U.S. Cl.
CPC ..... *G01N 27/9073* (2013.01); *E21B 47/0905* (2013.01); *E21B 47/102* (2013.01);
(Continued)

(58) Field of Classification Search
CPC .. G01N 27/9073; G01N 27/9033; G01V 3/30; E21B 47/0905; E21B 47/102; E21B 47/08
See application file for complete search history.

(56) References Cited

U.S. PATENT DOCUMENTS

| 5,446,382 | A | 8/1995 | Flora |
| 7,960,969 | B2 | 6/2011 | Mouget et al. |

(Continued)

FOREIGN PATENT DOCUMENTS

WO 2017082902 5/2017

OTHER PUBLICATIONS

International Search Report and Written Opinion for Application No. PCT/US2017/039547 dated Jun. 27, 2017.

*Primary Examiner* — Elias Desta
(74) *Attorney, Agent, or Firm* — Benjamin Fite; C. Tumey Law Group PLLC (57) ABSTRACT

Eddy current logging enables corrosion monitoring in nested-pipe arrangements. An illustrative method of logging total thickness of the pipe walls includes acquiring measurements from an electromagnetic logging tool conveyed through the innermost bore, each measurement associated with a TRF combination (transmit antenna, receive antenna, and frequency), and further associated with a position along the bore. Multiple scale factors are applied to the measurements to determine multiple total thickness estimates for each position, each of the multiple scale factors corresponding to a subset of single-pipe defect profiles. Preferably, every possible single-pipe defect profile is included in at least one of these subsets. A total thickness log value for each position is derived from the multiple total thickness estimates for that position, and the derived total thickness (Continued)

log values are used to update a displayed total thickness log as the measurements are being acquired.

19 Claims, 5 Drawing Sheets (51) Int. Cl.
    *E21B 47/09*     (2012.01)
    *G01V 3/30*     (2006.01)
    *E21B 47/08*     (2012.01)

(52) U.S. Cl.
    CPC ........... *G01N 27/9033* (2013.01); *G01V 3/30* (2013.01); *E21B 47/08* (2013.01)

(56) References Cited

U.S. PATENT DOCUMENTS

| | | |
|---|---|---|
| 9,476,857 B2 * | 10/2016 | Legendre .............. E21B 47/082 |
| 9,823,374 B2 * | 11/2017 | McCafferty ......... E21B 47/1005 |
| 10,012,753 B2 * | 7/2018 | Nichols ............... E21B 47/0905 |
| 2015/0127274 A1 | 5/2015 | Legendre et al. |
| 2015/0241596 A1 | 8/2015 | Donderici |
| 2016/0245779 A1 | 8/2016 | Khalaj et al. |

* cited by examiner

REMOTE-FIELD EDDY CURRENT BASED TOTAL THICKNESS LOGGING

BACKGROUND

To access subsurface reservoirs of hydrocarbons, water, geothermal heat, or other valuable resources, drillers create boreholes through the intervening rock formations, typically lining them with steel casing and inserting steel production tubing to define one or more flow paths for fluid to enter or leave the borehole. Complex wells with many stages may have multiple casing and tubing strings in a nested, concentric arrangement within the borehole. Herein, the term "pipe" is used to refer generically to all types of borehole tubing including casing, drill strings, production strings, intervention strings, continuous/coiled tubing, and threaded tubing.

As the subsurface reservoirs often contain dissolved salts or acidic fluids at elevated temperatures, the exposed pipe tends to corrode. If such corrosion is not monitored and corrected or otherwise accounted for, it can lead to isolation failures. Even if such failures don't rise to the level of a well blowout (although that is a possibility), they can cause fluid loss and potentially catastrophic formation damage. Thus a number of downhole tools have been developed to inspect for pipe corrosion, including calipers, cameras, acoustic tools, and electromagnetic tools. Of these, only the electromagnetic tools enable monitoring of corrosion of all the pipes in a nested, concentric arrangement. The other tools require the inner pipes to be removed to enable inspection of the outer ones.

Electromagnetic tools normally include multiple transmit and/or multiple receive antennas to acquire measurements with different antenna spacings, and may also (or alternatively) acquire measurements at different frequencies. Because measurements at different frequencies and different antenna spacings correspond to different regions of sensitivity, they can be inverted to determine the wall thickness of each pipe in a nested arrangement. Those pipes having their wall thickness reduced (relative to their initial, nominal thickness) beyond a threshold have likely been weakened by corrosion and may require replacement or other remedial action.

For many, if not all, nested pipe arrangements, the inversion process is computationally intensive and cannot feasibly be conducted in real time as the measurement data is acquired. Yet it is desirable for the logging service providers and their customers to obtain some form of immediate feedback to verify that the necessary measurements are being acquired and to enable prompt corrective action. Further, if the feedback enables the provider to identify potentially problematic regions, the inversion process can be shortened and expedited by focusing the inversion solely on the problematic regions.

BRIEF DESCRIPTION OF THE DRAWINGS

Accordingly, there are disclosed herein remote-field eddy current (RFEC)-based techniques for quickly deriving a total thickness measurement from a multi-array electromagnetic logging tool. In the drawings.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Figures 1, 2:
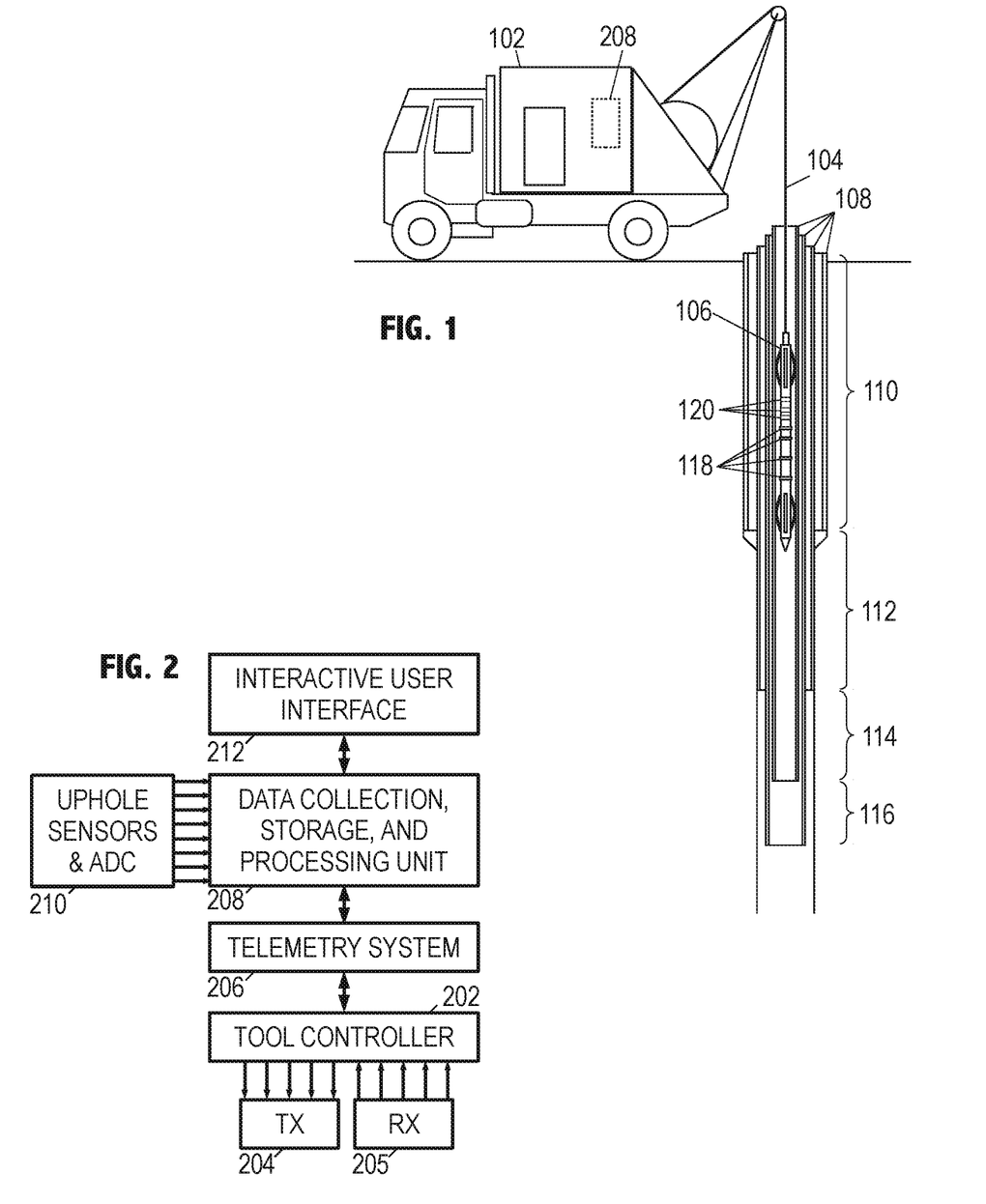
FIG. 1 is a diagram of an illustrative wireline logging environment.
FIG. 2 is a block diagram of an illustrative electromagnetic logging system.

To provide context and facilitate understanding of the present disclosure, FIG. 1 shows an illustrative wireline logging environment, in which a wireline logging truck 102 uses a wireline cable 104 to convey an electromagnetic logging tool 106 along a borehole via the innermost bore of a nested, roughly concentric arrangement of pipes 108. The wireline cable 104 includes conductors for supplying power to the tool 106 and for collecting measurement data from the tool.

Note that the illustrative wireline logging context is not limiting on the scope of the claims, as it will be understood by those in the art that other well-known methods and systems for conveying tools along the borehole would also be suitable for use with the electromagnetic logging tool. Such methods include logging while drilling (LWD) or measurement while drilling (MWD), where the electromagnetic logging tool is incorporated into a drill string and logging measurements are collected during the drilling process or as the drill string is tripped from the borehole. In a similar vein, the electromagnetic logging tool may be attached to the end of a continuous tubing (aka coil tubing) string to perform logging in horizontal or ascending segments of the borehole. Downhole tractor assemblies can also be used to convey the electromagnetic logging tool along the borehole. As many of these techniques may provide no electrical or optical conductors for conveying power to the tool and telemetry to the surface (including tubing-based or slickline-based conveyance) the electromagnetic logging tool may employ batteries or other downhole energy sources for power and may store measurements in memory for later retrieval when the tool returns to the surface. Alternative telemetry systems are known and may be employed for real-time telemetry in the absence of a wireline cable. Such telemetry systems include mud pulse telemetry, acoustic telemetry, and electromagnetic telemetry.

Returning to FIG. 1, as the pipes 108 may have different lengths and may each include different pipe types along their length (e.g., to trade off strength for flexibility), the borehole can be divided into a series of zones 110-116, each zone having a corresponding pipe profile. As used herein, the phrase "pipe profile" refers to the number, diameter, and thickness of pipes in the nested arrangement, optionally including other distinguishing parameters such as material type, conductivity, and magnetic permeability of each pipe.

Thus, e.g., zone 110 includes four pipes: an outer casing, an inner casing, an outer production tubing, and an inner production tubing. The outer casing does not extend beyond zone 110, leaving only three pipes in zone 112. Similarly, the inner casing does not extend below zone 112, leaving only the two production tubing strings in zone 114. In zone 116, only the outer production tubing string is present.

Electromagnetic logging tool 106 includes centralizers to keep the tool approximately centered within the innermost bore. Each of the transmit antennas 118 can transmit pulses of one or more sinusoidal carrier frequencies to induce eddy currents in the walls of the nested pipe arrangement. The eddy currents in turn generate magnetic fields that can be detected by the one or more receiver antennas 120. The transmit antenna transmissions can be time or frequency multiplexed, and the measurements of all the receive antennas can be made responsive to each such transmission, though in practice many tools acquire only a subset of all possible measurements. As these measurements are sensitive to different regions around the tool, depending on the carrier frequency and the spacing between the given transmit and receive antennas, we track the combination of transmit antenna, receive antenna, and carrier frequency (TRF) with which the measurement was obtained. Each unique combination of TRF that the tool acquires measurements for is hereafter termed a "TRF combination".

FIG. 2 shows the components of the electromagnetic logging system in block diagram form. Tool 106 includes an internal tool controller 202 that triggers transmissions at selected carrier frequencies from selected transmit antennas 204 and captures responsive measurements from selected receive antennas 205. The controller 202 measures at least the phase difference between the transmitted and received carrier signals, and preferably further measures the attenuation between the signals. (Note that phase and attenuation can be equivalently measured or expressed in terms of in-phase and quadrature-phase signal components.) While the receive antenna and frequency associated with each measurement is readily ascertained, the tool can discern the associated transmit antenna only if (a) there is only one antenna, or (2) some form of multiplexing is employed such as time division multiplexing (i.e., the transmit antennas are employed one at a time, in sequence) or frequency division multiplexing (each transmit antenna employs a unique set of carrier frequencies). The controller 202 enforces the multiplexing scheme and determines the TRF combination associated with each measurement.

Tool 106 further includes a telemetry system 206 that collects the phase and attenuation measurements from the tool controller 202, along with any other downhole sensor measurements (e.g., temperature, position, vibration), and modulates the information onto a telemetry signal which is sent via the wireline cable 104 to a data collection, storage, and processing unit 208. Unit 208 may take the form of a programmable general purpose computer equipped with data acquisition cards, network interfaces, information storage peripherals, and an interactive user interface 212. In addition to collecting measurements via the wireline cable 104, processing unit 208 may further collect measurements from wired and wireless uphole sensors 210 such as, e.g., wireline cable tension, wireline reel position, velocity, and acceleration, which are particularly useful for tracking the position of the tool 106 along the borehole.

Processing unit 208 stores the acquired measurements on nonvolatile information storage media (e.g., flash drives, magnetic disks) and, alone or in combination with other network-accessible computing facilities, processes the measurements to derive and display visual representations of the measurements. Often such measurements take the form of logs, i.e. graphs of the measurements (or the property they represent) as a function of tool position, time, true depth, or other independent variable property. The logging service provider equips the processing unit 208 with programming (in the form of software or firmware) in a system memory to provide computer-readable instructions for causing the processing units' programmable hardware (e.g., a central processing unit, a digital signal processing chip, a programmable logic array, or groups and combinations thereof) to implement the desired processing method for converting the tool measurements of phase and attenuation into valuable, meaningful, displays of the corresponding physical properties of the nested pipe arrangement.

Figure 3:
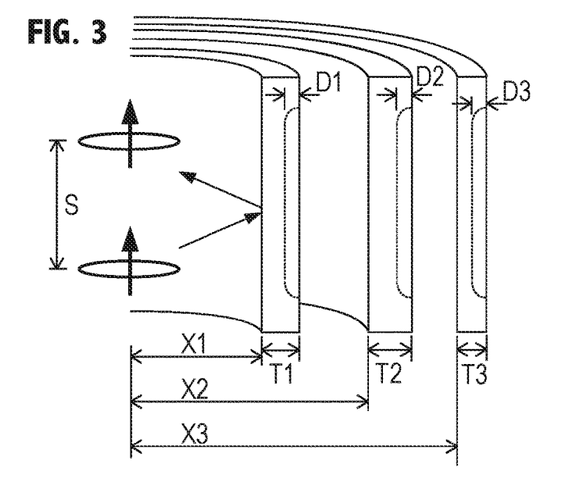
FIG. 3 is a diagram of an illustrative eddy current measurement model.

FIG. 3 is a cut-away model for illustrating the tool's operation and relating the tool measurements to specific model parameters. Note that the model and selected parameters are illustrative; other parameters and models can be used. The model of FIG. 3 shows a transmit antenna and receive antenna aligned on a tool axis, separated by a distance S. Coaxial to the tool are three pipes having inner diameters X1, X2, X3, and varying wall thicknesses T1, T2, T3. Possibly present on the three pipes are three wall-thinning defects of depths D1, D2, and D3. The separation S is known from the tool design, and the nominal diameters and thicknesses are known from the well plan, leaving the defect depths D1, D2, and D3 as the parameters to be found via inversion of measurements obtained with at least three TRF combinations. More complex models may allow for more pipes, along with eccentering of the tool and the pipe nesting, different material conductivities, and other such parameters, but at the cost of requiring a greater number of independent measurements to assure a stable inversion.

As it is generally infeasible to perform a full inversion during the logging process, certain simplifications may be applied to the model to permit a low-complexity approximation of the desired information. For example, a log of the total thickness of conductive material (for the example of FIG. 3, Ttotal=(T1−D1)+(T2−D2)+(T3−D3)) would reveal the presence of large defects, albeit without indicating the actual distribution of the wall thinning defects. Nevertheless, with the defect indications obtained from the total thickness log, a full inversion may be applied to targeted locations to determine the actual defect profile. (As used herein, the phrase "defect profile" refers to the pipe-specific distribution of wall thinning) Conversely, the absence of any large defects in the total thickness log may be taken as a tentative indication that all will be satisfactory when the full inversion is completed in due course.

If the multiple pipe walls were combined into a single wall exposed only to the remote field of the transmit antenna, the total wall thickness can be approximated by the relationship:

$$T_{total} \cong \phi \delta / 2$$

where $\delta$ is the skin depth of the metal forming the pipe wall, and $\phi$ is the measured phase difference between transmit and receive signals. This remote-field eddy current (RFEC) proportionality enables the total wall thickness to be estimated by scaling the phase measurement by a constant. Due to tool design and pipe arrangement variations, a suitable constant may be determined by modeling rather than tying it to the skin depth of the metal.

Figure 4:
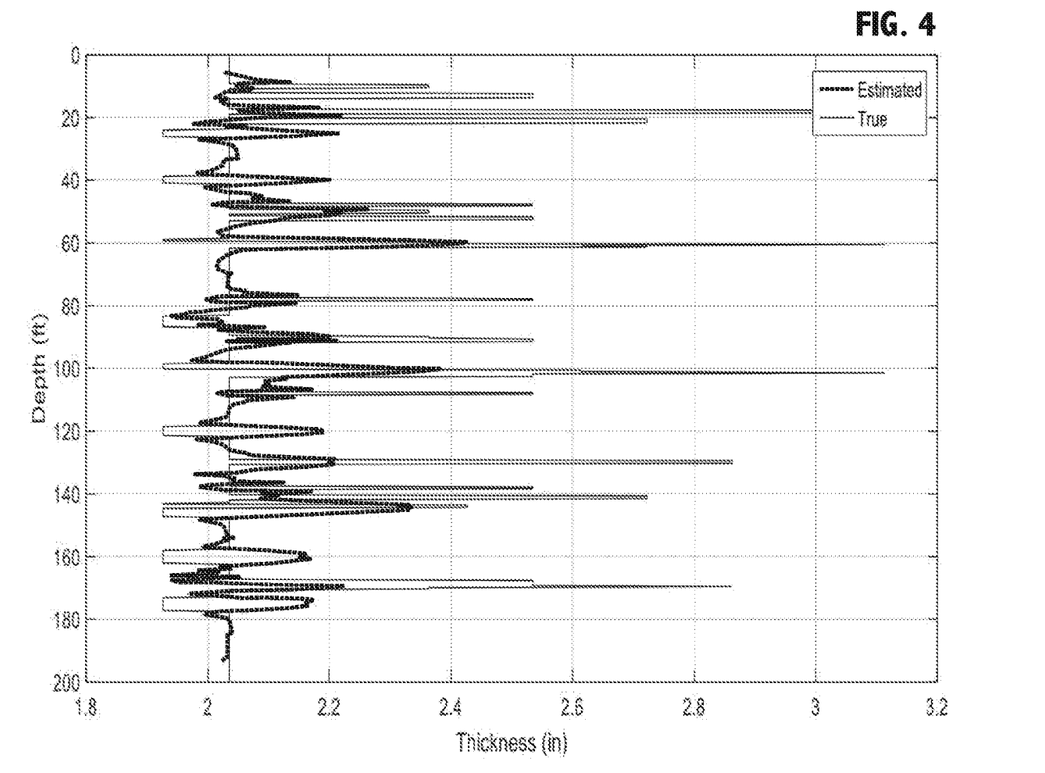
FIG. 4 is an illustrative single-array RFEC-based total thickness log.

FIG. 4 shows an illustrative total thickness log obtained using this RI BC proportionality as applied to measurements from a single TRF combination. The tool measurements were simulated using a nested five-pipe model with the total wall thickness as shown by the curve labeled "True". (The increased thickness regions represent threaded pipe collars. The model includes eight 0.1 inch defects on the innermost pipe.) The nominal outer diameters of the modeled pipes are (in inches): 2.875, 7.000, 9.625, 13.375, and 18.625. The nominal wall thicknesses are (in inches): 0.217, 0.324, 0.545, 0.514, and 0.435.

When the RFEC proportionality is applied to the simulated tool measurements, the estimated thickness as a function of depth is shown by the curve labeled "Estimated". While it is not critical for the estimated defect depth to match the true defect depth, the curves here are poorly matched, yielding little predictive power for this estimate. Indeed, many of the defects appear as bumps (increased thickness) on the walls.

Figure 5:
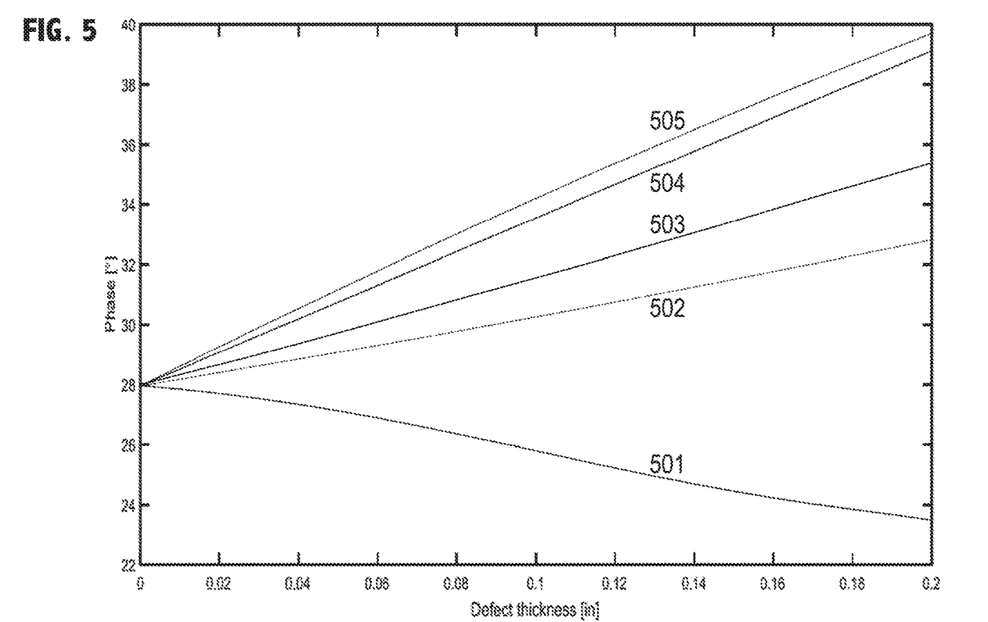
FIG. 5 is a graph of an illustrative measurement-phase dependence on defect profile.

This paradoxical result can be understood when considered in relation to FIG. 5. In the nested five-pipe model, the sensitivity of the measured phase difference to changing defect depth is shown for different defect profiles. For defects on the innermost pipe, curve 501 shows the relationship of the phase difference to the defect depth. For the second innermost pipe, curve 502 shows the relationship. Curves 503, 504, and 505 show the relationships for the middle pipe, the next outermost, and outermost. (While the defect profiles considered need not be limited to having the defect present on only one pipe, the distribution of the wall thinning across multiple pipes will result in an approximately linear combination of the single-pipe defect profile responses and can thus be readily envisioned from these curves.)

The linearity of the relationships in FIG. 5 is encouraging, but the paradoxical result noted above is a consequence of the slope's change in sign as the defect moves from innermost to outermost pipe. For the innermost pipe the slope is negative, while for the outermost pipe the slope is positive. If the average slope is used as the constant in with the RFEC proportionality, defects on the innermost pipe will masquerade as bumps that can potentially mask any defects present on the outer pipes.

Figure 6:
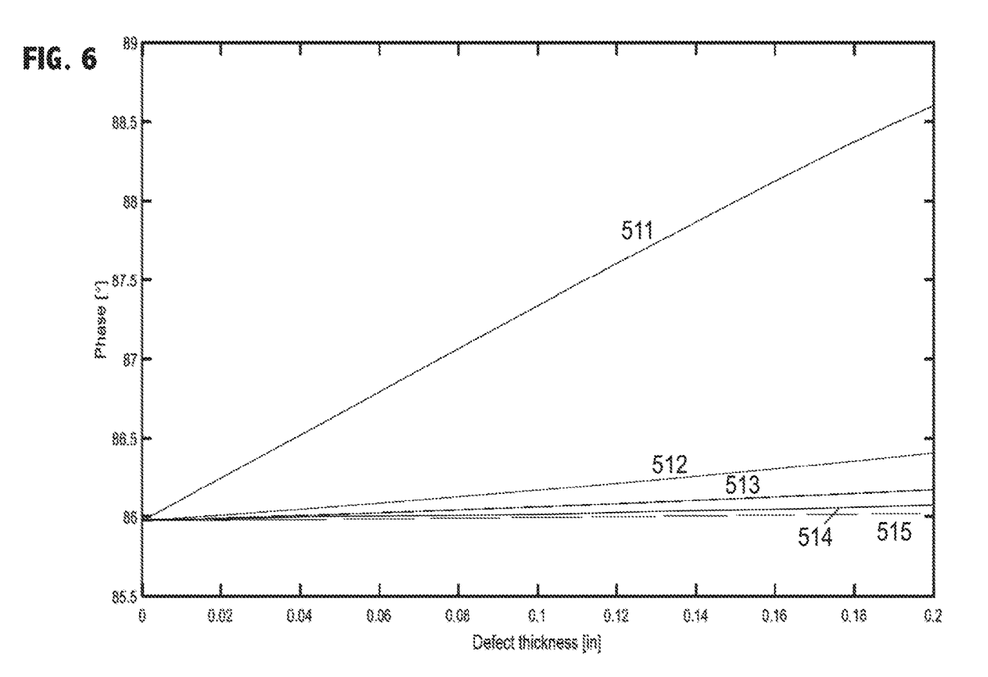
FIG. 6 is a graph of another illustrative measurement phase dependence on defect profile.

It may be an option to select a different TRF combination that lacks such a sign change. FIG. 6 shows the sensitivity of the phase difference measured with a transmit-receive antenna pairing having a significantly smaller spacing S. Curves 511, 512, 513, 514, and 515 correspond to the phase difference relationships to defects on the innermost, next innermost, middle, next outermost, and outermost pipes, respectively. While the sign change is absent, note that the measurements are relatively insensitive to defects on the outermost pipes, reducing the likelihood that such defects could be detected in real time.

Accordingly, the present disclosure employs phase difference measurements from multiple combinations to improve RFEC-based estimates of total thickness while keeping the computation requirement feasible for real time total thickness logging.

Figures 7, 8:
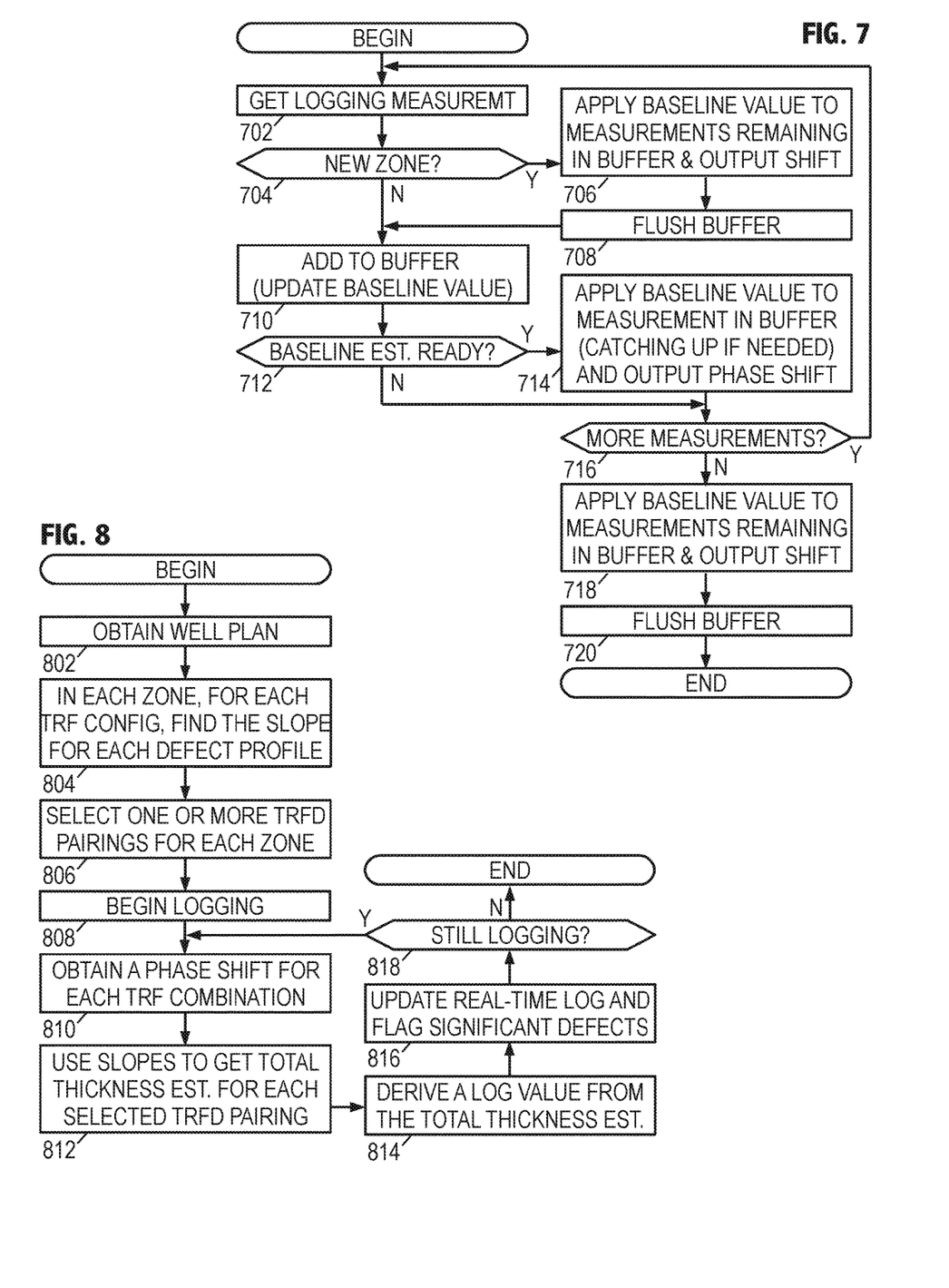
FIG. 7 is flowchart of an illustrative phase shift measurement method.
FIG. 8 is a flowchart of an illustrative improved RFEC based total thickness logging method.

As an initial matter, FIG. 7 addresses the issue of establishing a baseline measurement corresponding to the nominal total thickness. As shown in FIGS. 5 and 6, the responses converge to a baseline phase difference in the absence of any defect. In FIG. 5, the baseline phase difference $\phi$ for the first TRF combination's response to the nested 5-pipe model is 28°. In FIG. 6, the baseline phase difference for the second TRF combination's response to the nested 5-pipe model is about 86°. However, the model may not fully account for the environmental and manufacturing variations of the tool and nested pipe arrangement, so the actual baseline phase difference is expected to deviate somewhat from this model value. Fortunately, corrosion and other defects are generally limited in spatial extent, enabling the true baseline to be determined from a median or average measurement. During real time logging operations, however, it becomes necessary to form a baseline estimate without yet having acquired all the measurements.

Thus, the processing unit may employ any suitable approach for estimating the baseline phase shift. FIG. 7 shows one such approach for a given TRF combination. (The method may be implemented in parallel for multiple TRF combinations.) As the electromagnetic logging tool communicates phase shift measurements to the processing unit, the measurements for the given TRF combination are obtained one at a time in time- or depth-order in block 702. In block 704, the processing unit determines whether the measurement correspond to a new zone in the borehole. This determination can be made based on estimated position of the tool, alone or in combination with a sudden, substantial change in the measurements.

If the measurement is from a new zone, the processing unit completes (in block 706) operations on any previously-obtained measurements remaining in the buffer, before flushing the buffer in block 708. The operations in block 706 include subtracting the estimated baseline phase difference from the measured phase differences, yielding phase shift measurements that are output for subsequent processing.

After the buffer is flushed in block 708, or after the processing unit determines in block 704 that the measurement is not associated with a different zone than the measurements in the buffer, the current measurement is added to the first-in first-out (FIFO) buffer in block 710. The processing unit optionally updates the estimated baseline based on this addition in block 710. Alternatively, the update may occur later (e.g., in blocks 706, 714, and 718). The estimated baseline may be the average or median of the measurements in the buffer. Other contemplated methods of estimating the baseline include the use of weighted averaging, low-pass filtering, and minimum mean square error (MMSE) linear fitting. The buffer length is chosen to optimize the tradeoff between the noisiness of the estimate and the consequent delay in the display of the logging data. Depending on tool velocity and sampling rate, the buffer length may, by way of a non-limiting example, correspond to an illustrative logging distance of 2 to 60 meters. In some contemplated embodiments, the estimated baseline is "frozen" (no longer updated) after predetermined number of measurements have been obtained within the current zone. In addition to eliminating the buffer delay, such freezing may reduce the apparent noise on the thickness log due to noise in the baseline estimate.

In block 712, the processing unit determines whether the end of the buffer has been reached (i.e., whether sufficient measurements have been obtained for a reliable estimate of the baseline). If so, in block 714 the processing unit subtracts the estimated baseline phase difference from the oldest measured phase difference in the buffer, and outputs the resulting phase shift for subsequent processing. If the estimated baseline is intended for the midpoint (or any other position besides the beginning) of the buffer window, the processing unit may perform a catch-up operation, employing the current estimate to determine the phase shifts for all remaining measurements preceding and including the intended position for the estimate and outputting these measured phase shifts in rapid sequence.

After block 712 or 714, the processing unit determines whether the logging operation is ongoing, i.e., whether additional measurements will be available. If so, the processing unit returns to block 702. If not, then the processing unit the processing unit completes (in block 718) operations on any measurements remaining in the buffer, outputting the resulting phase shift measurements for subsequent processing before flushing the buffer in block 720.

Having addressed the baseline estimation issue, we now describe the illustrative multi-array RFEC based total thickness logging method shown in FIG. 8. In block 802, the processing unit obtains the well plan, which provides the materials, dimensions, and positions of the pipes within the borehole. In block 804, the processing unit divides the borehole into zones having distinct pipe arrangements. The processing unit models the pipe arrangement for each zone, and simulates the response of each TRF combination of the tool to the defect profiles having single-pipe defects to determine the slope (i.e., sensitivity) for each TRF combination and defect profile.

In the following discussion, the single-pipe defect profiles for a given nested-pipe arrangement are grouped into a full set, which may then be partitioned into distinct subsets. For each defect profile set or subset, a TRF combination is selected. In some cases, the same TRF combination may be used for multiple subsets. Each pairing of a TRF combination with a defect profile subset may be referred to below as a TRFD pairing.

As discussed previously, some TRF combinations are sensitive to some defect profiles and not others, or have a negative slope for some defect profiles and not others. In block 806, the processing unit selects one or more TRF combinations to be used for RFEC-based total thickness logging. If one TRF combination offers sufficient sensitivity to all defect profiles having single-pipe defects, the subsequent processing need only employ that TRF combination for the entire set of defect profiles. Otherwise, the defect profiles are grouped into subsets that are paired with potentially different TRF combinations.

The TRF pairing selection process may employ multiple tests. For a given subset of defect profiles, the each TRF combination will have a sensitivity (i.e., slope) to each defect profile in the subset. The slope with the smallest absolute value ("minimum magnitude") preferably exceeds some threshold based on the anticipated level of logging noise. As a non-limiting example, an illustrative threshold for the slope of the phase difference would be 1°/cm. A second illustrative test may be whether the ratio of the largest to the smallest slope is positive and in the range between, e.g., 1 and 10. A TRF combination that satisfies both tests for the given subset of defect profiles may be considered a sufficiently sensitive TRFD pairing. If multiple TRF combinations are sufficiently sensitive for the given subset of defect profiles, the TRF combination with the smallest ratio for the considered subset of defect profiles may be preferred. If multiple TRF combinations for the given subset have similar "smallest" ratios, the TRF combination having the largest minimum magnitude slope may be preferred.

If no single TRF combination passes both tests for the full set of defect profiles, the processing unit divides the set of defect profiles into two subsets. Initially the first subset includes only the defect profile having the defect on the innermost pipe, and the second subset includes the remaining defect profiles. The tests are then repeated separately for the subsets. At least one TRF combination should provide sufficient sensitivity for the defect profile having the defect on the innermost pipe, and it is expected that at least one TRF combination will provide sufficient sensitivity for the second subset of defect profiles. If not, the second subset will be further reduced, moving the profile having the defect on the next innermost pipe to the first subset or a new, third subset. At the conclusion of block 806, the processing unit will have selected one, two, or possibly more TRFD pairings in this manner for each zone. In each zone, the processing unit preferably determines an average slope of the selected TRF combination's sensitivity to the defect profiles in the associated subset. Note that the same TRF combination can be selected for different subsets, but the average slope would be different for the different subsets. Other suitable selection methods may alternatively be employed, including visual comparison by the operator with manual selection of the TRFD pairings. A library of previously-encountered or simulated nested pipe configurations and corresponding selected TRFD pairings may also be compiled and employed.

In block 808, the processing unit begins the logging operation, collecting electromagnetic logging tool measurements as the tool is conveyed along the borehole through the various zones of the nested pipe configuration. In block 810, the processing unit applies a suitable baseline estimation method such as that in FIG. 7, to the logging tool measurements to determine phase shift measurements for each TRF combination as a function of position along the borehole (or at least the TRF combinations of the pairings selected in block 810). In block 812, the relevant phase shift measurements are scaled by the average slopes of the selected TRFD pairing, yielding an estimated defect depth for each selected TRFD pairing. When subtracted from the nominal total wall thickness of the nested pipe configuration, the estimated defect depths yield an estimated total thickness for each selected TRFD pairing.

In block 814, the processing unit operates on the thickness estimates to derive a total thickness log value for the corresponding position of the tool along the borehole. In block 816, the processing unit updates the real time display of the total thickness log, optionally flagging regions having significant wall thinning. In block 818, the processing unit determines whether logging is ongoing, and if so, returns to block 810. Otherwise the method concludes.

Various suitable methods exist for deriving the log value from the total thickness estimates in block 814. If only one TRFD pairing is selected, only one thickness estimate is available and is used as the log value. In certain embodiments where each pipe is treated as a separate subset in block 806, each pipe has a selected TRFD pairing. In these embodiments, the thickness estimates may be combined with a weighted average. However, certain preferred embodiments use one of the methods of FIG. 9 or 10 to derive the log value from the thickness estimates of multiple TRFD pairings in block 814.

Figure 9:
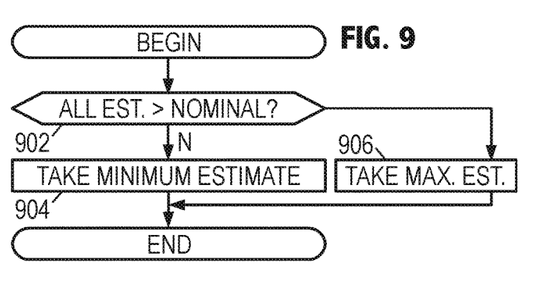
FIG. 9 is a flowchart of an illustrative method for combining RFEC-based measurements assuming different defect profiles.

In FIG. 9, the processing unit determines in block 902 whether all of the thickness estimates are greater than the nominal total thickness of the nested pipe arrangement. If not, the processing unit conservatively adopts the most pessimistic estimate (i.e., the minimum total thickness estimate) as the log value in block 904. Otherwise, in block 906, the processing unit adopt the maximum total thickness estimate, as most selected TFRD pairings are expected to be relatively insensitive to the presence of collars.

Figure 10:
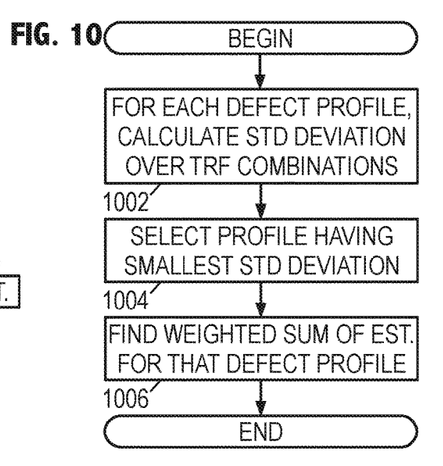
FIG. 10 is a flowchart of another illustrative method for combining RFEC-based measurements assuming different defect profiles.

In FIG. 10, rather than relying on the selected TRFD pairings, the processing unit in block 1002 uses all of the slopes providing each TRF combination's sensitivity to each possible combination of the single-pipe defect profiles. The measurement from each TRF combination is scaled by each of the slopes, providing a defect depth estimate (or equivalently, a total thickness estimate) as a function of the defect profile. In block 1004, the processing unit determines, for each defect profile, the standard deviation of the depth (or total thickness) estimates. The defect profile having the smallest deviation is selected as the most probably correct, and the depth estimates for that defect profile are combined (e.g., as a weighted average) in block 1006, yielding a total thickness log value.

Figure 11:
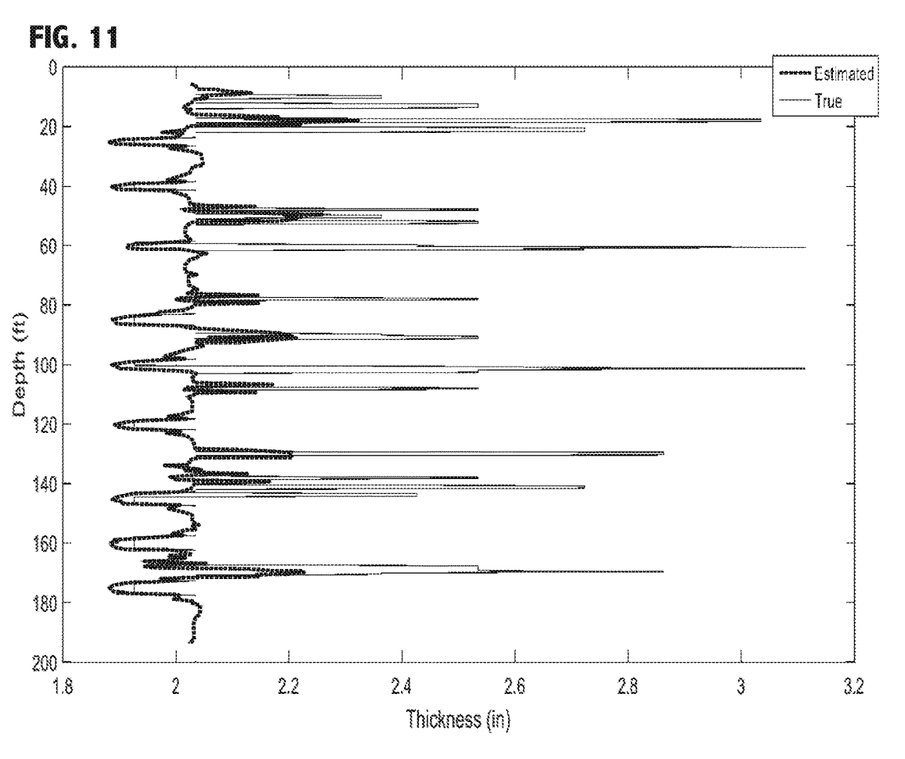
FIG. 11 is an illustrative improved RFEC-based total thickness log.

FIG. 11 shows the total thickness log for the same simulated response as in FIG. 4, applying the methods of FIGS. 7-9. The TRF combination of FIG. 5 is employed for the four outermost pipes and the combination of FIG. 6 is employed for the defect profile subset having only the innermost pipe. Significantly, each of the modeled defects has a corresponding dip in the total thickness log, indicating substantially increased accuracy of the RFEC-based total thickness logging with minimal increase in computational overhead.

Accordingly, the embodiments disclosed herein include:

Embodiment A: A method of logging total thickness of pipe walls in a nested-pipe arrangement, the method comprising: acquiring measurements from an electromagnetic logging tool conveyed along a bore of the nested-pipe arrangement, each measurement associated with a TRF combination of transmit antenna, receive antenna, and frequency, and further associated with a point along the nested-pipe arrangement; applying multiple scale factors to the measurements to determine multiple total thickness estimates for each point along the nested-pipe arrangement, each of the multiple scale factors for measurements by a given TRF combination corresponding to a subset of single-pipe defect profiles, wherein every single-pipe defect profile for the nested-pipe arrangement is included in at least one subset for at least one of the multiple scale factors; deriving a total thickness log value for each point along the nested-pipe arrangement from the multiple total thickness estimates for that point; and using the derived total thickness log values to update a displayed total thickness log as the measurements are being acquired.

Embodiment B: A corrosion monitoring system that comprises: a downhole electromagnetic logging tool and a processing unit. The downhole electromagnetic logging tool is conveyable along a bore of a nested-pipe arrangement, and includes one or more transmit antennas operating at one or more signal frequencies to induce an eddy current in conductive walls of the nested-pipe arrangement, and further includes one or more receive antennas to measure, for each of multiple combinations of transmit antenna, receive antenna, and signal frequency ("TRF combinations"), a phase difference created by the induced eddy current as a function of position. The processing unit is coupled to the logging tool to collect, store, and process the measured phase differences to provide a total thickness log contemporaneously with said collecting and storage. The processing includes: obtaining scale factors for a current zone of the nested-pipe arrangement, each scale factor representing the sensitivity of a TRF combination to a subset of single-pipe defect profiles, wherein every single-pipe defect profile of the nested-pipe arrangement in that zone is included in at least one of said subsets; applying the scale factors to measured phase differences of respective TRF combinations to determine a total thickness estimate for each said subset; deriving a total thickness log value from the total thickness estimates; and updating a displayed total thickness log with the derived log values.

Each of the foregoing embodiments may further include any of the following additional elements alone or in any suitable combination: 1. said obtaining includes: segmenting the nested-pipe arrangement into zones based on a well plan; determining scale factors for each zone; and selecting a zone containing a current position of the tool as the current zone. 2. said applying includes: subtracting, from the measured phase differences associated with each TRF combination, a baseline measurement value for that TRF combination to obtain a phase shift; scaling the phase shift by one of the scaling factors to obtain an estimated defect size; and summing the estimated defect size with a nominal total thickness to obtain a total thickness estimate. 3. the nested-pipe arrangement is located within a borehole, and each measurement and each of the multiple total thickness estimates is associated with a position along the borehole. 4. said applying further includes determining whether said position is associated with a transition between zones and if so: performing said subtracting, scaling, summing, and using operations on any measurements from a previous zone remaining in a buffer; flushing the buffer; and buffering measured phase differences from the current zone to determine a new baseline measurement value. 5. said applying includes obtaining scale factors for the nested-pipe arrangement of a current zone. 6. said deriving includes: selecting a minimum total thickness estimate as the total thickness log value unless all total thickness estimates are greater than a nominal total thickness, in which case a maximum total thickness estimate is selected as the total thickness log value. 7. each of the multiple scale factors corresponds to a different subset of single-pipe defect profiles, and no two subsets have a shared single-pipe defect profile. 8. the multiple scale factors include at least one scale factor representing a sensitivity of each of multiple TRF combinations to each single-pipe defect profile. 9. said deriving includes: calculating a standard deviation of total thickness estimates for each possible combination of single-pipe defect profiles; and combining the total thickness estimates for the defect profile having a smallest standard deviation. 10. said deriving includes: calculating a standard deviation of total thickness estimates for each single-pipe defect profile; and selecting a minimum of the total thickness estimates for the single-pipe defect profile having a smallest standard deviation. 11. said measurements comprise a phase difference between transmitted and received signals, and wherein the scale factors represent an average sensitivity of the phase difference for the associated TRF combination to a defect size in the corresponding subset of single-pipe defect profiles.

Numerous other modifications, equivalents, and alternatives, will become apparent to those skilled in the art once the above disclosure is fully appreciated. For example, the total thickness log values and estimates are mathematically fungible with log values and estimates of total defect size. It is intended that the following claims be interpreted to embrace all such modifications, equivalents, and alternatives where applicable.

What is claimed:

1. A method of logging total thickness of pipe walls in a nested-pipe arrangement, the method comprising:
   acquiring measurements from an electromagnetic logging tool conveyed along a bore of the nested-pipe arrangement, each measurement associated with a transmit antenna, receiver antenna, and signal frequency (TRF) combination of transmit antenna, receive antenna, and frequency, and further associated with a point along the nested-pipe arrangement;

applying multiple scale factors to the measurements to determine multiple total thickness estimates for each point along the nested-pipe arrangement, each of the multiple scale factors for measurements by a given TRF combination corresponding to a subset of single-pipe defect profiles, wherein every single-pipe defect profile for the nested-pipe arrangement is included in at least one subset for at least one of the multiple scale factors;

deriving a total thickness log value for each point along the nested-pipe arrangement from the multiple total thickness estimates for that point; and using the derived total thickness log values to update a displayed total thickness log as the measurements are being acquired.

2. The method of claim 1, wherein said applying includes:
subtracting, from the measurements associated with each TRF combination, a baseline measurement value for that TRF combination to obtain a phase shift;
scaling the phase shift by the scaling factor to obtain an estimated defect size; and
summing the estimated defect size with a nominal total thickness to obtain a total thickness estimate.

3. The method of claim 2, wherein the nested-pipe arrangement is located within a borehole, and wherein each measurement and each of the multiple total thickness estimates is associated with a position along the borehole.

4. The method of claim 3, wherein said applying further includes determining whether said
position is associated with a transition between borehole zones and if so:
performing said subtracting, scaling, summing, and using operations on any measurements from a previous zone remaining in a buffer;
flushing the buffer;
obtaining scale factors for the nested-pipe arrangement of a current zone; and
buffering measurement from the current zone to determine a new baseline measurement valve.

5. The method of claim 1, wherein said deriving includes:
selecting a minimum total thickness estimate as the total thickness log value unless all total thickness estimates are greater than a nominal total thickness, in which case a maximum total thickness estimate is selected as the total thickness log value.

6. The method of claim 5, wherein each of the multiple scale factors corresponds to a different subset of single-pipe defect profiles, and no two subsets have a shared single-pipe defect profile.

7. The method of claim 1, wherein the multiple scale factors include at least one scale factor representing a sensitivity of each of multiple TRF combinations to each single-pipe defect profile.

8. The method of claim 7, wherein said deriving includes:
calculating a standard deviation of total thickness estimates for any possible combination of defect profiles and combining or selecting from the total thickness estimates of the defect profile having a smallest standard deviation.

9. The method of claim 1, wherein said measurements comprise a phase difference between transmitted and received signals, and wherein the scale factors represent an average sensitivity of the phase difference for the associated TRF combination to a defect size in the corresponding subset of single-pipe defect profiles.

10. A corrosion monitoring system that comprises:
a downhole electromagnetic logging tool conveyable along a bore of a nested-pipe arrangement with one or more transmit antennas operating at one or more signal frequencies to induce an eddy current in conductive walls of the nested-pipe arrangement, and further including one or more receive antennas to measure, for each of multiple combinations of transmit antenna, receive antenna, and signal frequency ("TRF combinations"), a phase difference created by the induced eddy current as a function of position; and
a processing unit coupled to the logging tool to collect, store, and process the measured phase differences to provide a total thickness log contemporaneously with said collecting and storage, wherein the processing includes:
obtaining scale factors for a current zone of the nested-pipe arrangement, each scale factor representing the sensitivity of a TRF combination to a subset of single-pipe defect profiles, wherein every single-pipe defect profile of the nested-pipe arrangement in that zone is included in at least one of said subsets;
applying the scale factors to measured phase differences of respective TRF combinations to determine a total thickness estimate for each said subset;
deriving a total thickness log value from the total thickness estimates; and
updating a displayed total thickness log with the derived log values.

11. The system of claim 10, wherein said obtaining includes:
segmenting the nested-pipe arrangement into zones based on a well plan;
determining scale factors for each zone; and
selecting a zone containing a current position of the tool as the current zone.

12. The system of claim 11, wherein said applying includes:
subtracting, from the measured phase differences associated with each TRF combination, a baseline measurement value for that TRF combination to obtain a phase shift;
scaling the phase shift by one of the scaling factors to obtain an estimated defect size; and
summing the estimated defect size with a nominal total thickness to obtain a total thickness estimate.

13. The system of claim 12, wherein said applying further includes determining whether said
position is associated with a transition between zones and if so:
performing said subtracting, scaling, summing, and using operations on any measurements from a previous zone remaining in a buffer;
flushing the buffer;
buffering measured phase differences from the current zone to determine a new baseline measurement value.

14. The system of claim 10, wherein said deriving includes:
selecting a minimum total thickness estimate as the total thickness log value unless all total thickness estimates are greater than a nominal total thickness, in which case a maximum total thickness estimate is selected as the total thickness log value.

15. The system of claim 10, wherein each of the scale factors corresponds to a different subset of single-pipe defect profiles, and no two subsets have a shared single-pipe defect profile.

16. The system of claim 10, wherein the multiple scale factors include at least one scale factor representing a sensitivity of each of multiple TRF combinations to each defect profile.

17. The system of claim 16, wherein said deriving includes:
- calculating a standard deviation of total thickness estimates for each possible defect profile; and
- combining the total thickness estimates for the defect profile having a smallest standard deviation.

18. The system of claim 16, wherein said deriving includes:
- calculating a standard deviation of total thickness estimates for each single-pipe defect profile; and
- selecting a minimum of the total thickness estimates for the single-pipe defect profile having a smallest standard deviation.

19. The system of claim 10, the scale factors represent an average sensitivity of the phase difference for the associated TRF combination to a defect size in the corresponding subset of single-pipe defect profiles.

* * * * *